United States Patent
Kim (10) Patent No.: US 11,003,924 B2
(45) Date of Patent: May 11, 2021

(54) SYSTEM AND METHOD FOR DETECTING CLOSE CUT-IN VEHICLE BASED ON FREE SPACE SIGNAL

(71) Applicant: Mando Corporation, Pyeongtaek-si (KR)

(72) Inventor: Tae Han Kim, Seongnam-si (KR)

(73) Assignee: MANDO CORPORATION, Pyeongtaek-si (KR)

(*) Notice: Subject to any disclaimer, the term of this patent is extended or adjusted under 35 U.S.C. 154(b) by 95 days.

(21) Appl. No.: 16/287,072

(22) Filed: Feb. 27, 2019

(65) Prior Publication Data
US 2019/0266421 A1 Aug. 29, 2019

(30) Foreign Application Priority Data
Feb. 27, 2018 (KR) .......................... 10-2018-0023790

(51) Int. Cl.
*G06K 9/00* (2006.01)
*H04N 7/18* (2006.01)

(52) U.S. Cl.
CPC ..... *G06K 9/00805* (2013.01); *G06K 9/00825* (2013.01); *H04N 7/18* (2013.01); *H04N 7/188* (2013.01)

(58) Field of Classification Search
CPC ..................... G06K 9/00805; G06K 9/00825
See application file for complete search history.

(56) References Cited

U.S. PATENT DOCUMENTS 5,369,590 A * 11/1994 Karasudani ............. G01S 11/12
180/167
6,223,117 B1 * 4/2001 Labuhn ................. B60W 30/16
701/93
(Continued)

FOREIGN PATENT DOCUMENTS

JP 4321410 B2 * 8/2009
JP 2017-154614 A 9/2017
(Continued)

OTHER PUBLICATIONS

Autonomous cruise control with cut-in target vehicle detection, Ashwin Caravalho et al., Researchgate, 2016, pp. 1-7 (Year: 2016).*

(Continued)

*Primary Examiner* — Jayesh A Patel
(74) *Attorney, Agent, or Firm* — Morgan, Lewis & Bockius LLP (57) ABSTRACT

The present invention relates to a system and method for detecting a close cut-in vehicle based on free space, wherein the system includes a front camera detecting free space information displaying objects in front of own vehicle and transmitting the information to an electronic control unit, and a cut-in vehicle detection unit selecting a close cut-in vehicle as a control target through a situation analysis by using the free space information inputted from the front camera, and performing a deceleration control in response to the calculated demand acceleration by using a relative speed of the selected control target, whereby a collision risk of ACC (Adaptive Cruise Control) can be reduced and a traveling stability can be enhanced by moving up a recognition time of a close cut-in vehicle using free space information.

16 Claims, 5 Drawing Sheets

(56) References Cited

U.S. PATENT DOCUMENTS

| | | | | |
|---|---|---|---|---|
| 6,760,061 | B1* | 7/2004 | Glier | G08G 1/04 340/435 |
| 6,978,037 | B1* | 12/2005 | Fechner | G06K 9/00798 382/103 |
| 7,444,241 | B2* | 10/2008 | Grimm | B60T 7/22 340/901 |
| 7,610,121 | B2* | 10/2009 | Nishira | B60T 7/22 340/901 |
| 7,753,153 | B2* | 7/2010 | Swoboda | G08G 1/167 180/170 |
| 8,571,786 | B2* | 10/2013 | Iwasaki | B60W 10/06 701/300 |
| 9,000,903 | B2* | 4/2015 | Bowers | G06Q 40/08 340/436 |
| 9,002,614 | B2* | 4/2015 | Tominaga | B60W 50/0097 701/96 |
| 9,511,711 | B2* | 12/2016 | Petrillo | B60Q 9/008 |
| 9,928,430 | B2* | 3/2018 | Levi | G06T 7/50 |
| 2002/0027503 | A1* | 3/2002 | Higuchi | G05D 1/0257 340/436 |
| 2003/0069695 | A1* | 4/2003 | Imanishi | G06T 7/593 701/301 |
| 2004/0149504 | A1* | 8/2004 | Swoboda | B60K 31/0008 180/169 |
| 2006/0235597 | A1* | 10/2006 | Hori | G08G 1/096758 701/96 |
| 2007/0150196 | A1* | 6/2007 | Grimm | B60T 7/22 701/301 |
| 2007/0291130 | A1* | 12/2007 | Broggi | G01S 17/931 348/218.1 |
| 2008/0025568 | A1* | 1/2008 | Han | G06K 9/4642 382/103 |
| 2008/0243351 | A1* | 10/2008 | Isogai | B60W 30/16 701/96 |
| 2009/0048768 | A1* | 2/2009 | Taguchi | G08G 1/166 701/117 |
| 2012/0008129 | A1* | 1/2012 | Lu | G01S 17/89 356/5.01 |
| 2012/0078500 | A1* | 3/2012 | Yamada | B60W 50/14 701/301 |
| 2012/0154591 | A1* | 6/2012 | Baur | B60R 1/00 348/148 |
| 2013/0151058 | A1* | 6/2013 | Zagorski | B60W 30/0956 701/23 |
| 2014/0205184 | A1* | 7/2014 | Franke | G06K 9/00805 382/154 |
| 2014/0219506 | A1* | 8/2014 | Foltin | G06K 9/00825 382/104 |
| 2015/0197249 | A1* | 7/2015 | Sakima | B60W 30/165 701/96 |
| 2015/0206015 | A1* | 7/2015 | Ramalingam | G06K 9/00791 382/104 |
| 2016/0193997 | A1* | 7/2016 | Yellambalase | B60W 30/08 701/36 |
| 2016/0260323 | A1* | 9/2016 | Blekken | G08G 1/02 |
| 2017/0153639 | A1* | 6/2017 | Stein | G06K 9/00805 |
| 2017/0364082 | A1* | 12/2017 | Taieb | G05D 1/0246 |
| 2018/0089997 | A1* | 3/2018 | Ho | G08G 1/04 |
| 2018/0225975 | A1* | 8/2018 | Park | G08G 1/052 |
| 2018/0232947 | A1* | 8/2018 | Nehmadi | G01S 17/931 |
| 2018/0300561 | A1* | 10/2018 | Steyer | G05D 1/0255 |
| 2018/0370531 | A1* | 12/2018 | Matsunaga | B60W 10/18 |
| 2019/0258878 | A1* | 8/2019 | Koivisto | G05D 1/00 |
| 2019/0263344 | A1* | 8/2019 | Yokoi | B60W 30/09 |
| 2019/0277968 | A1* | 9/2019 | Lu | B60R 1/00 |
| 2019/0346561 | A1* | 11/2019 | Hofmann | G01S 7/415 |
| 2020/0104607 | A1* | 4/2020 | Kim | G06T 7/13 |
| 2020/0218979 | A1* | 7/2020 | Kwon | B60W 60/0011 |

FOREIGN PATENT DOCUMENTS

| | | | |
|---|---|---|---|
| KR | 10-2016-0071164 A | | 6/2016 |
| KR | 101711964 B1 | * | 3/2017 |

OTHER PUBLICATIONS

Detection of new in-path targets by drivers using stop and go adaptive cruise control, Neville A. Stanton et al., Elsevier, 2011, pp. 592-601 (Year: 2011).*

Free-Space Detection with Self-Supervised and Online Trained Fully Convolutional Networks, Willem P. Sanberg et al., arXiv: 1604.02316v2, Jan. 5, 2017, pp. 1-8 (Year: 2017).*

Free-Space Detection with Fish-Eye Cameras, Simon Hänisch et al., IEEE, 978-1-5090-4804-5, 2017, pp. 135-140 (Year: 2017).*

Stereo Vision Enabling Fast Estimation of Free Space on Traffic Roads for Autonomous Navigation, K. Y. Lee et al., DOI 10.1007/s12239-015-0012-7, 2015, pp. 107-115 (Year: 2015).*

Office Action issued in Korean Patent Application No. 10-2018-0023790 dated Aug. 2, 2019, with English translation.

* cited by examiner

SYSTEM AND METHOD FOR DETECTING CLOSE CUT-IN VEHICLE BASED ON FREE SPACE SIGNAL

CROSS-REFERENCE TO RELATED APPLICATION

Pursuant to 35 U.S.C. § 119 (a), this application claims the benefit of earlier filing date and right of priority to Korean Patent Application No. 10-2018-0023790, filed on Feb. 27, 2018, the contents of which are hereby incorporated by reference in their entirety.

BACKGROUND

1. Field of the Invention

The present invention relates to a system and method for detecting a close cut-in vehicle based on free space signal, and more particularly to a system and method for detecting a close cut-in vehicle based on free space signal configured to reduce a collision risk of ACC (Adaptive Cruise Control) and to enhance a traveling stability by moving up a recognition time of a close cut-in vehicle.

2. Discussion of Related Art

In general, an ACC is a system that selects a preceding vehicle as a control target using vehicle detection information detected by a sensor and automatically controls a travel speed and a vehicle-to-vehicle distance (distance to a preceding vehicle) through an acceleration/deceleration control to greatly mitigate a driver's driving burden during traveling.

Figure 3:
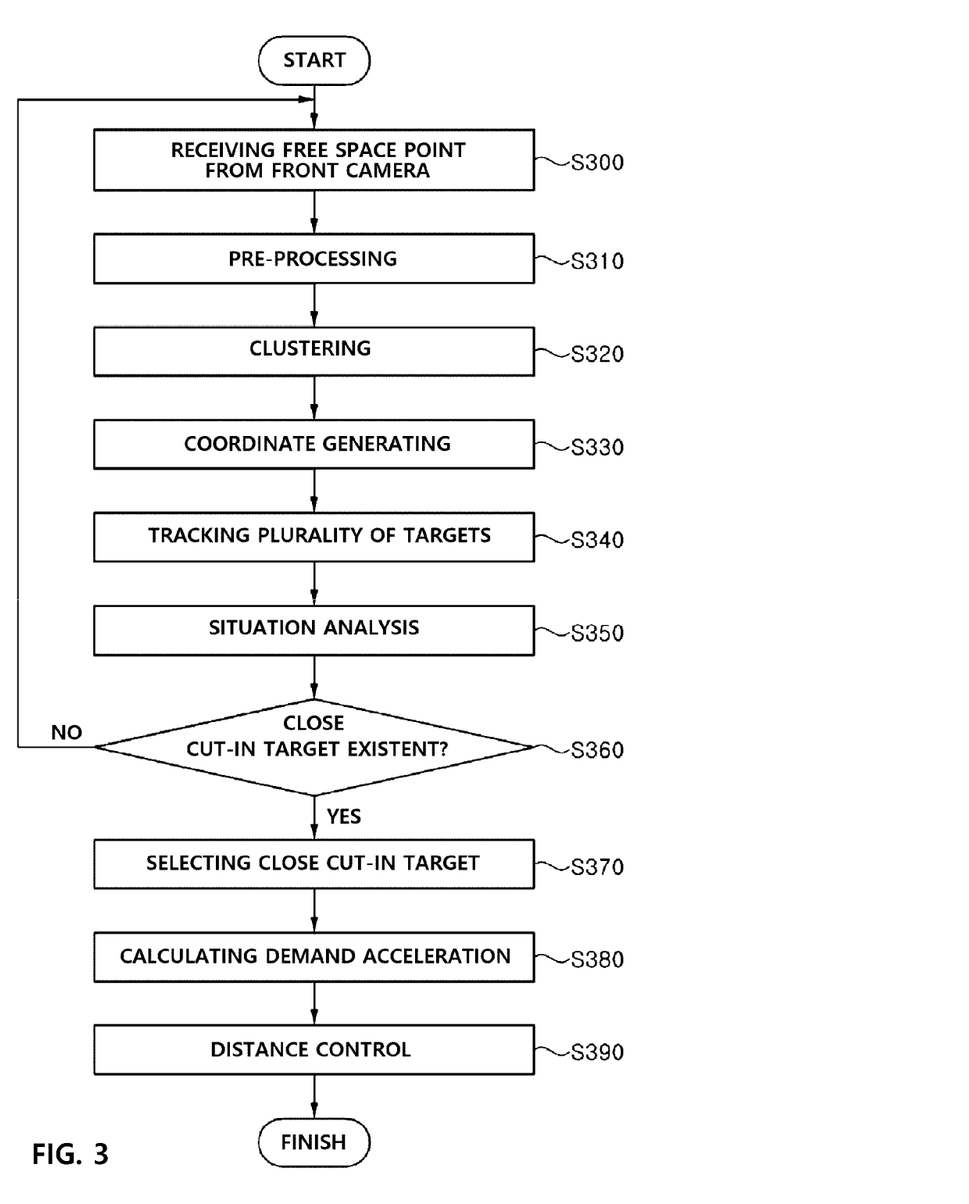
FIG. 3 is a schematic flow chart illustrating an overall process of a close cut-in vehicle detection method according to an exemplary embodiment of present invention.
Figure 4:
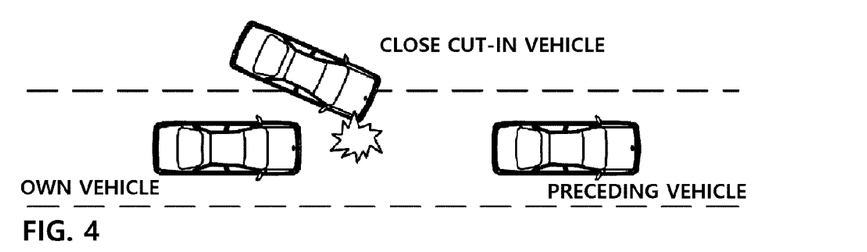
FIG. 4 is a schematic view illustrating a close cut-in situation between my own vehicle and a preceding vehicle.

However, the conventional ACC suffers from drawbacks of collision risks due to existence of limit in detecting a close cut-in vehicle as shown in FIG. 3 because of limited field of view (FoV) of front camera and a rear camera.

CITED REFERENCE DOCUMENT

Patent Document (Patent Document 1) US Laid-Open Patent Publication NO.: 2016/0260323 (Sep. 8, 2016)

(Patent Document 2) Korean Registered Patent Publication NO.: 1711964 (Mar. 13, 2017)

SUMMARY OF THE INVENTION

The present invention is provided to solve at least one or more of the above problems and/or disadvantages in whole or in part and it is an object of the present invention to provide a system and method for detecting a close cut-in vehicle based on free space signal (hereinafter also referred to as "close cut-in vehicle detection system and method") configured to reduce a collision risk of ACC (Adaptive Cruise Control) and to enhance a traveling stability by moving up a recognition time of a close cut-in vehicle using free space of an image photographed by a front camera.

In one general aspect of the present invention, there is provided a system for detecting a close cut-in vehicle based on free space signal, comprising:

a front camera detecting free space information displaying objects in front of my own vehicle and transmitting the information to an electronic control unit; and a cut-in vehicle detection unit selecting a close cut-in vehicle as a control target through a situation analysis using the free space information received from the front camera, and implementing an advancing direction speed control in response to a demand acceleration calculated by using a relative speed of the selected control target.

The cut-in vehicle detection unit may include a close cut-in situation analyzer that receives point-type free space information from the front camera, pre-processes the received free space information and clusters the information with predetermined objects, tracks a feature point from point group of clustered multiple objects, and determine the close cut-in situation in response to estimated operation (travel speed and direction), a close cut-in target selector that selects a relevant close cut-in vehicle as a control target when there is existent a close cut-in situation, and a distance controller that automatically controls a vehicle-to-vehicle distance against the selected control target.

The cut-in vehicle situation analyzer may be so configured as to cluster object points of the free space information with predetermined objects, extract a particular feature value from point groups of clustered objects to generate coordinates of objects, estimate operations by tracking the generated coordinates and determine a close cut-in situation in response to the estimated operations.

The estimated operation may include a travel speed and direction of an object.

The feature value may show a weight center and a corner of the objects.

The close cut-in situation analyzer may determine an object of a relevant coordinate as a vehicle when the generated coordinate possesses a speed.

The close cut-in situation analyzer may determine as a close cut-in situation when the coordinate is situated within a predetermined area from the own vehicle, or predict a next position of coordinate using the speed possessed by the coordinate, and determine as the close cut-in situation when the predicted position is situated within a predetermined area from the own vehicle.

The distance controller may calculate a demand acceleration using a relative speed of selected control target, and implement an advancing direction deceleration control in response to the calculated demand acceleration. Other details of the present invention are included in the detailed description and the drawings.

As explained above, the system and method according to the present invention has an advantageous effect in that a collision risk of ACC (Adaptive Cruise Control) can be reduced and a traveling stability can be enhanced by moving up a recognition time of a close cut-in vehicle using free space information.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

The advantages, characteristics and methods to accomplish the same will be clarified with reference to exemplary embodiments to be described in detail along with the accompanying drawings. However, the present invention is not limited to the exemplary embodiments to be disclosed hereinafter, and may, however, be embodied in many different forms and should not be construed as being limited to the embodiments set forth herein; rather, these embodiments are provided so that this disclosure will be thorough and complete, and will fully convey the concept of example embodiments to those of ordinary skill in the art. Wherever possible, the same reference numerals will be used throughout the drawings and the description to refer to the same or like parts.

Now, hereinafter, the close cut-in vehicle detection system and method based on free space signal according to the present invention will be described in detail with reference to the accompanying drawings.

Figure 1:
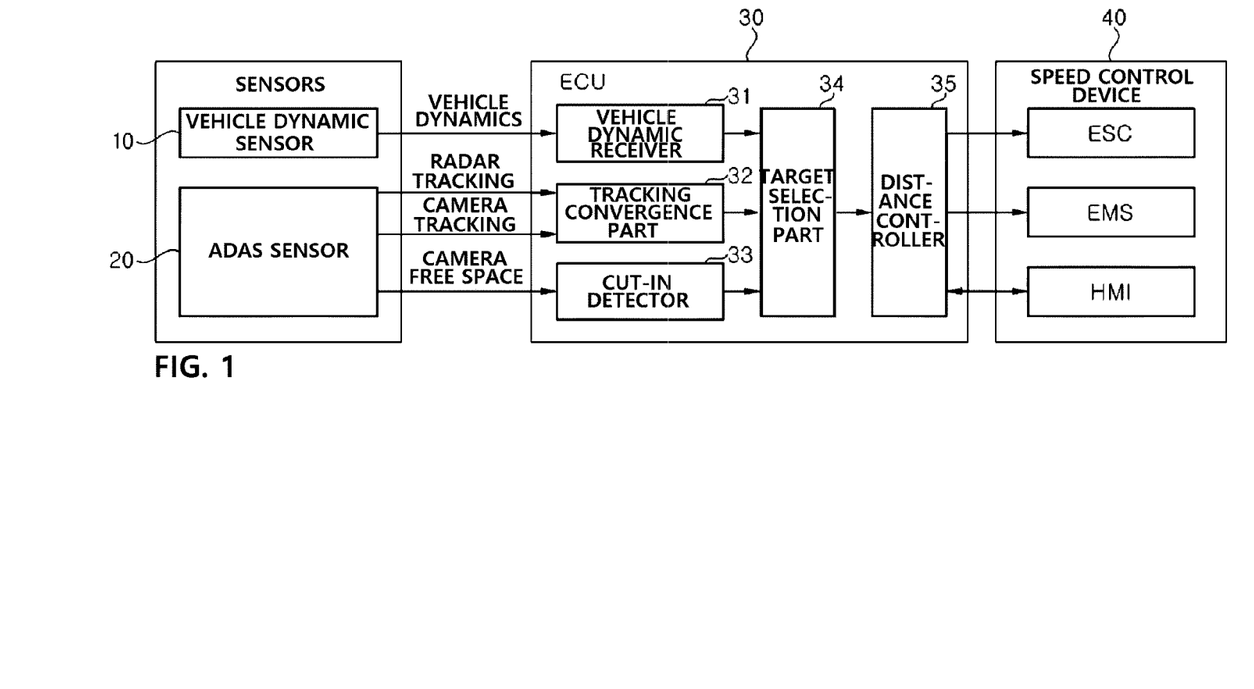
FIG. 1 is a schematic block diagram illustrating an overall configuration of ACC system applied by a close cut-in vehicle detection method according to an exemplary embodiment of present invention.

FIG. 1 is a schematic block diagram illustrating an overall configuration of ACC system applied by a close cut-in vehicle detection method according to an exemplary embodiment of present invention.

Referring to FIG. 1, an ACC system applied with the close cut-in vehicle detection method according to an exemplary embodiment may be configured by including a vehicle dynamic sensor 10, an ADAS (Advanced Driver Assistance System) sensor 20, an electronic control unit (ECU) 30 and a speed control device 40.

The vehicle dynamic sensor 10, which is a sensor disclosed by various prior arts such as a wheel speed sensor, an acceleration sensor, a yew rate sensor and a steering angle sensor, may be disposed at an appropriate position including, but not limited to, a wheel and a steering wheel of my own vehicle to detect a travel speed, an acceleration, a yew acceleration and a steering angle and transmit the detected data to the electronic control unit 30.

The ADAS sensor 20, which is a sensor disclosed by various prior arts, may be provided at a front central and corner area of a vehicle to emit an electromagnetic wave to a front side of a detection sensor within a scope of predetermined angle, and receive the electromagnetic wave reflected from an object disposed at a surrounding area of the vehicle, whereby an angle, a distance, and a relative speed between own vehicle and a surrounding object may be detected, which are then transmitted to the electronic control unit 30.

Furthermore/alternatively, the ADAS sensor 20, which is an image sensor disclosed by various prior arts such as a FIR (Far Infra Red) camera and a CMOS (Complementary metal-oxide-semiconductor) camera or a CCD (charge-coupled device) camera, may be provided on an upper end of a front glass of a vehicle to detect and project a light of various bands such as infrared ray band and visible ray band within a predetermined angle and distance of a front of a camera, whereby an image of outside object can be obtained and transmitted to the electronic control unit 30.

Figure 2:
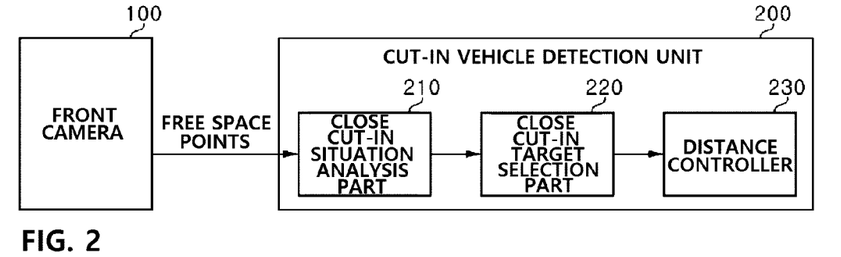
FIG. 2 is a schematic block diagram illustrating a configuration of a close cut-in vehicle detection system according to an exemplary embodiment of present invention.

The electronic control unit 30 of a vehicle may be disposed with a memory (DB) such as ROM (Read Only Memory) and RAM (Random Access Memory) to store various control programs and control data such as close cut-in vehicle detection programs illustrated in FIG. 2, and may additionally include a processing device such as a CPU (Central Processing Unit) to implement various control programs.

The electronic control unit 30 according to the present invention may include a vehicle dynamic receiver 31, a tracking convergence part 32, a cut-in vehicle detector 33, a target selector 34 and a distance controller 35, receive detection signals from a vehicle dynamic sensor 10 and an ADAS sensor 20, and select a front vehicle as a control target by using vehicle detection information detected by the sensor, and automatically control a travel speed and a vehicle-to-vehicle distance through acceleration control.

The speed control device 40 may perform a deceleration braking operation (ESC, electronic stability control) or an acceleration control operation (EMS) by receiving a control signal of the electronic control unit 30.

FIG. 2 is a schematic block diagram illustrating a configuration of a close cut-in vehicle detection system applicable to an ACC of FIG. 1 according to an exemplary embodiment of present invention.

As illustrated in FIG. 2, the close cut-in vehicle detection system according to an exemplary embodiment of present invention may be configured by including a front camera 100 and a cut-in vehicle detection unit 200.

Figure 5:
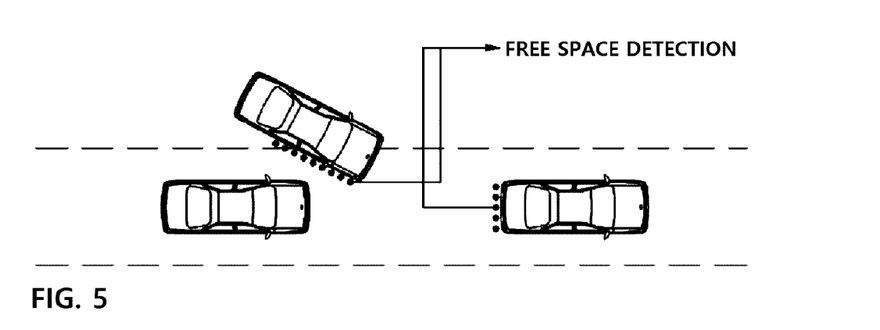
FIG. 5 is a schematic view illustrating a close cut-in situation based on free space signal.

The front camera 100 may be provided at a front surface of a vehicle to detect a free space, which is an area travelable by own vehicle, including lane information within a predetermined scope of a front of a camera, and transmit free space information displaying objects as illustrated in FIG. 5 in points to the cut-in vehicle detection unit 200.

Here, an output type of free space information may be formed with 64 points, for example. Furthermore, one point may be comprised of a total of 24 bits including 10 bits indicating a position to an advancing direction side, 11 bits indicating a lateral direction position relative to the advancing direction and 3 bits indicating vehicles, road boundaries and tangible information of other objects.

Figure 6:
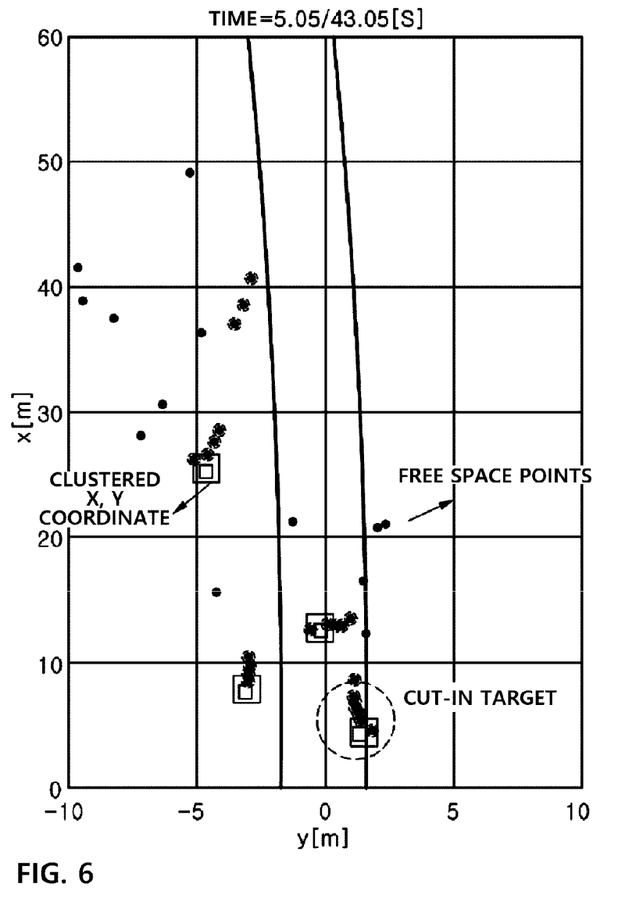
FIG. 6 is a schematic view illustrating a close cut-in vehicle detection method according to the present invention.

Furthermore, in order to reduce a collision risk of ACC system and to enhance a travel stability by moving up a recognition time of a vehicle cutting in at a close range using free space information of cut-in vehicle detection unit 200, a close cut-in vehicle may be selected as a control target through situation analysis as illustrated in FIG. 6 using free space information of point type received from the front camera 100, and deceleration control to an advancing direction may be implemented by calculating demand acceleration using a relative speed of selected control target.

To be more specific, the cut-in vehicle detection unit 200 may include a close cut-in situation analyzer 210 that receives point-type free space information from the front camera 100, pre-processes the received free space information and clusters the information with predetermined objects, tracks a feature point from point group of clustered multiple objects, and determine the close cut-in situation in response to estimated operation, a close cut-in target selector 220 that selects a relevant close cut-in vehicle as a control target when there is existent a close cut-in situation, and a distance controller 230 that automatically controls a vehicleto-vehicle distance against the selected control target. The estimated operation may include a travel speed and direction of an object.

The present invention proposes a control method in which a close cut-in vehicle is selected as a control target through situation analysis using point-type free space information (e.g., free space signal of Mobileye) received from the front camera 100, and a vehicle-to-vehicle distance control against the selected control target is implemented.

Hereinafter, the close cut-in vehicle detection method based on free space using the system configured as illustrated in FIG. 3 according to the present invention will be described.

Referring to FIG. 3, the close cut-in vehicle detection unit 200 may receive point-type free space information as shown in FIG. 5 from the front camera 100 (S300).

Successively, the close cut-in vehicle detection unit 200 may pre-process (filtering, noise removal) the point-type free space information received from the front camera 100 as illustrated in FIG. 6 (S310), cluster in predetermined objects (S320), extract a particular value (e.g., weight center, corner of objects) from the point groups of clustered multiple objects (N, N is more than 1) to generate a coordinate (xn, yn) of free space groups (cloudings, assemblies) (S330), estimate an operation (position, speed) by tracking the generated xn, yn coordinate of multiple targets (S340), determine a close cut-in situation in response to the estimated operation (S350), and select the close cut-in vehicle as a control target (S370) when there is existent a close cut-in situation (example of S360).

The point of free space information used in the step of selecting control target may include vehicles, road boundaries and tangible information of other objects, but the classification function thereof is not accurate.

Thus, the step of S340 may determine that an object of relevant coordinate is a vehicle when the xn, yn coordinate possesses a speed and then track the xn, yn coordinate. Furthermore, the step of S350 may determine as a close cut-in situation when the tracked xn, yn coordinate is situated within a predetermined area from the own vehicle, predict a next position of coordinate using the speed possessed by the tracked xn, yn coordinate, and determine as the close cut-in situation when the predicted position is situated within a predetermined area from the own vehicle.

The close cut-in vehicle detection unit 200 may calculate a demand acceleration (S380) using a relative speed of selected control target, after the control target is selected through the abovementioned control target selection step, and implement an advancing direction deceleration control in response to the calculated demand acceleration (S390).

Although the abovementioned embodiments according to the present invention have been described in detail with reference to the above specific examples, the embodiments are, however, intended to be illustrative only, and thereby do not limit the scope of protection of the present invention. Thereby, it should be appreciated by the skilled in the art that various changes, modifications and amendments to the above examples may be made without deviating from the scope of protection of the invention.

What is claimed is:

1. A system for detecting a close cut-in vehicle based on a free space signal, comprising:
   a front camera detecting free space information displaying objects in front of an own vehicle as points; and
   a processor receiving the free space information and detecting the close cut-in vehicle in response to the free space information using a movement of a particular point among the points,
   wherein the processor clusters the points into predetermined groups as the objects.

2. The system of claim 1, wherein the processor determines a close cut-in situation in response to an operation predicted by tracking the particular point from each of the clustered point.

3. The system of claim 2, wherein the processor selects a relevant close cut-in vehicle as a control target when the close cut-in situation is existent.

4. The system of claim 3, wherein the processor automatically controls a vehicle-to-vehicle distance from the control target.

5. The system of claim 2, wherein the processor generates coordinates of the objects by extracting a particular value therefrom in order to cluster the points into the groups, predicts a travel speed and a travel direction by tracking the generated coordinates of each object, and determines the close cut-in situation in response to the predicted travel speed and direction.

6. The system of claim 5, wherein the particular point is a weight center and a corner of each object.

7. The system of claim 5, wherein the processor determines an object among the clustered groups as a vehicle when a corresponding coordinate of the object possess a speed.

8. The system of claim 7, wherein the processor determines the close cut-in situation when the corresponding coordinate is within a predetermined area from the own vehicle, or predicts a next position of coordinate using the speed possessed by the corresponding coordinate and determines as the close cut-in situation when the predicted position is within the predetermined area from the own vehicle.

9. The system of claim 4, wherein the processor calculates a demand acceleration using a relative speed of the control target, and performs a travelling direction deceleration control in response to the calculated demand acceleration.

10. A method for detecting a close cut-in vehicle based on free space signal, comprising:
    receiving, from a front camera of an own vehicle, free space information displaying objects as points; and
    clustering the points into predetermined groups as the objects and analyzing a close cut-in situation using a travel speed and a travel direction of a particular point in the points.

11. The method of claim 10, further comprising:
    selecting the close cut-in vehicle as a control target; and
    automatically controlling a vehicle-to-vehicle distance with the control target upon analyzing that the close cut-in situation exits.

12. The method of claim 10, further comprising:
    generating coordinates of the groups by extracting a particular value from the clustered, points
    predicting operations by tracking the generated coordinates, and
    determining the close cut-in situation in response to the predicted operations.

13. The method of claim 12, wherein the particular value is a weight center and a corner of the groups.

14. The method of claim 12, wherein the analyzing the close cut-in situation includes determining that a clustered group is a vehicle when a corresponding coordinate of the clustered group possess a speed.

15. The method of claim 14, wherein the analyzing the close cut-in situation includes determining the close cut-in situation when the corresponding coordinate is within a predetermined area from the own vehicle, or determining the close cut-in situation when a next position of coordinate is predicted using the speed possessed by the coordinates and when the predicted position is within the predetermined area from the own vehicle.

16. The method of claim 11, wherein, the automatically controlling the vehicle-to-vehicle distance includes:
   calculating a demand acceleration using a relative speed of the control target; and
   performing a deceleration control in response to the demand acceleration.

* * * * *